United States Patent [19]

Funke

[11] Patent Number: 5,710,567
[45] Date of Patent: Jan. 20, 1998

[54] ANTENNA LOCKING DEVICE USING MAGNETIC ATTRACTIVE ELEMENTS WHEN ANTENNA IS EXTENDED

[75] Inventor: Magnus Funke, Åkersberga, Sweden

[73] Assignee: Allgon AB, Akersberga, Sweden

[21] Appl. No.: 590,911

[22] Filed: Jan. 24, 1996

[30] Foreign Application Priority Data

Oct. 25, 1995 [SE] Sweden ................................ 9503758

[51] Int. Cl.[6] ........................................ H01Q 1/24
[52] U.S. Cl. ............... 343/702; 343/725; 343/900; 343/901
[58] Field of Search ..................... 343/702, 900, 343/901, 903, 877, 787, 725, 729; H01Q 1/24

[56] References Cited

U.S. PATENT DOCUMENTS

| | | | |
|---|---|---|---|
| 3,611,390 | 10/1971 | Chiron | 343/787 |
| 4,121,218 | 10/1978 | Irwin et al. | 343/702 |
| 4,868,576 | 9/1989 | Johnson, Jr. | 343/702 |
| 5,317,325 | 5/1994 | Bottomley | 343/702 |

FOREIGN PATENT DOCUMENTS

| | | |
|---|---|---|
| 0467822A2 | 1/1992 | European Pat. Off. . |
| 0516490A2 | 12/1992 | European Pat. Off. . |
| WO94/10720 | 5/1994 | WIPO . |

*Primary Examiner*—Michael C. Wimer
*Attorney, Agent, or Firm*—Jacobson, Price, Holman & Stern, PLLC

[57] ABSTRACT

An antenna device for a piece of equipment for transmitting and/or receiving radio signals, wherein the antenna device comprises a first extendable antenna (2), which is movable between an extended position, where it is coupled to the circuitry of the piece of equipment and a retracted position where it is not coupled to the circuitry, the extendable antenna (2) on its lower portion having first holding device (10) cooperating with a second holding device (9) arranged on a guide (5) for the first antenna such that the first antenna is releasably locked in the extended position. According to the invention the first antenna (2) is releasably locked by the first and second holding devices comprising mutually magnetically attractive elements (9,10).

19 Claims, 1 Drawing Sheet

ANTENNA LOCKING DEVICE USING MAGNETIC ATTRACTIVE ELEMENTS WHEN ANTENNA IS EXTENDED

BACKGROUND OF THE INVENTION

This invention concerns an antenna device for a portable piece of equipment for transmitting and/or receiving radio signals, said antenna device comprising a extendable antenna, which is movable between an extended position, where it is coupled to the circuitry of the piece of equipment and a retracted position where it is essentially not coupled to said circuitry, said extendable antenna on its lower portion having first holding means cooperating with second holding means which is arranged on a guide means for the extendable antenna such that the extendable antenna is releasably locked in the extended position.

WO 94/10720 describes antennas for mobile telephones including in combination a helical antenna arranged outside of the main body of a mobile telephone, an extendable rod antenna and an impedance transformer. According to this publication switching is achieved by extending and retracting the rod antenna. In the retracted position the rod antenna is neither galvanically nor capacitively coupled to the impedance transformer. In this position the antenna function thus consists of only the helical antenna which is constantly coupled to the impedance transformer. In the extended position the helical antenna and the rod antenna are connected in parallel to the impedance transformer. Coupling is possible to obtain with either galvanical or non-galvanical coupling of RF-signals, e.g. between the rod antenna and the helical antenna/the impedance transformer or between the helical antenna/the rod antenna and the impedance transformer.

The coupling and decoupling of the rod antenna is thus effected by extending and retracting the antenna rod. The extension thereof is limited by the lower part of the rod antenna being stopped by a contact part and a sleeve. The contact parts also serve as a mechanical locking mechanism for the antenna rod in its extended position. According to another example, when the coupling is capacitive, one of the meeting elements may be provided with a thin insulating layer.

The mechanical locking of the mutually movable parts, however, brings about demands of high precision in manufacture with respect to the co-operating elements. Because of these demands and the fact that the solution presupposes the assembling of a number of elements the production costs are relatively high.

SUMMARY OF THE INVENTION

It is an aim of this invention to overcome the above mentioned disadvantages and to suggest an antenna device which may be produced at a low price and which provides a distinct locking in the extended position of the extendable antenna, repetitively with the same locking force.

This aim is achieved in an antenna device according to the above by the extendable antenna being releasably locked by the first and second holding means comprising mutually magnetically attractive elements.

By providing the locking function magnetically there is no need for a particularly high precision between contacting parts in order to achieve a sufficient locking force, since the co-operating holding means may be manufactured with play with respect to each other. Further, a distinct stop is obtained in the extended position which facilitates obtaining of the position in which the antenna is fully extended and indicates to the user when full extension of the antenna is achieved. Another important advantage is that practically no wear occurs between the mutually moving parts in the device according to the invention irrespective of axial or even rotating movements of the antenna. In case of capacitive coupling of the extendable antenna in its extended position the solution according to the invention enhances the antenna function since such a coupling is relatively dependent on correct orientation of the coupling parts. This advantage is further enhanced by the first and the second holding means comprising abutting surfaces which contact each other in and define said extended position.

By first and second holding means being arranged to couple the extendable antenna galvanically to said circuitry a reliable and efficient function for the antenna device is guaranteed.

By the second holding means comprising a magnet and in particular said magnet being annular and surrounding the rod antenna, sufficient locking force is easily obtained with a relatively small magnet and the magnet may be located such that the influences on the antenna function are minimized.

The additional feature that the first holding means includes a magnet brings about an easily produced and economical solution.

This invention is particularly advantageous if it also includes a second antenna. This solution is particularly useful in connection with portable telephones or similar pieces of equipment.

The feature that the second antenna is a helical antenna and more in particular wherein the helical antenna is arranged so as to surround the movement path of the extendable antenna and said guide means being arranged on or in the casing or the support body for the helical antenna brings about a compact and easily manufactured antenna device.

This invention also concerns a piece of equipment for transmitting and/or receiving radio signals including a device according to the above.

BRIEF DESCRIPTION OF THE DRAWINGS

The invention will now be described in greater detail at the background of an embodiment and with reference to the annexed drawings, wherein.

DESCRIPTION OF A PREFERRED EMBODIMENT

Figures 1, 2:
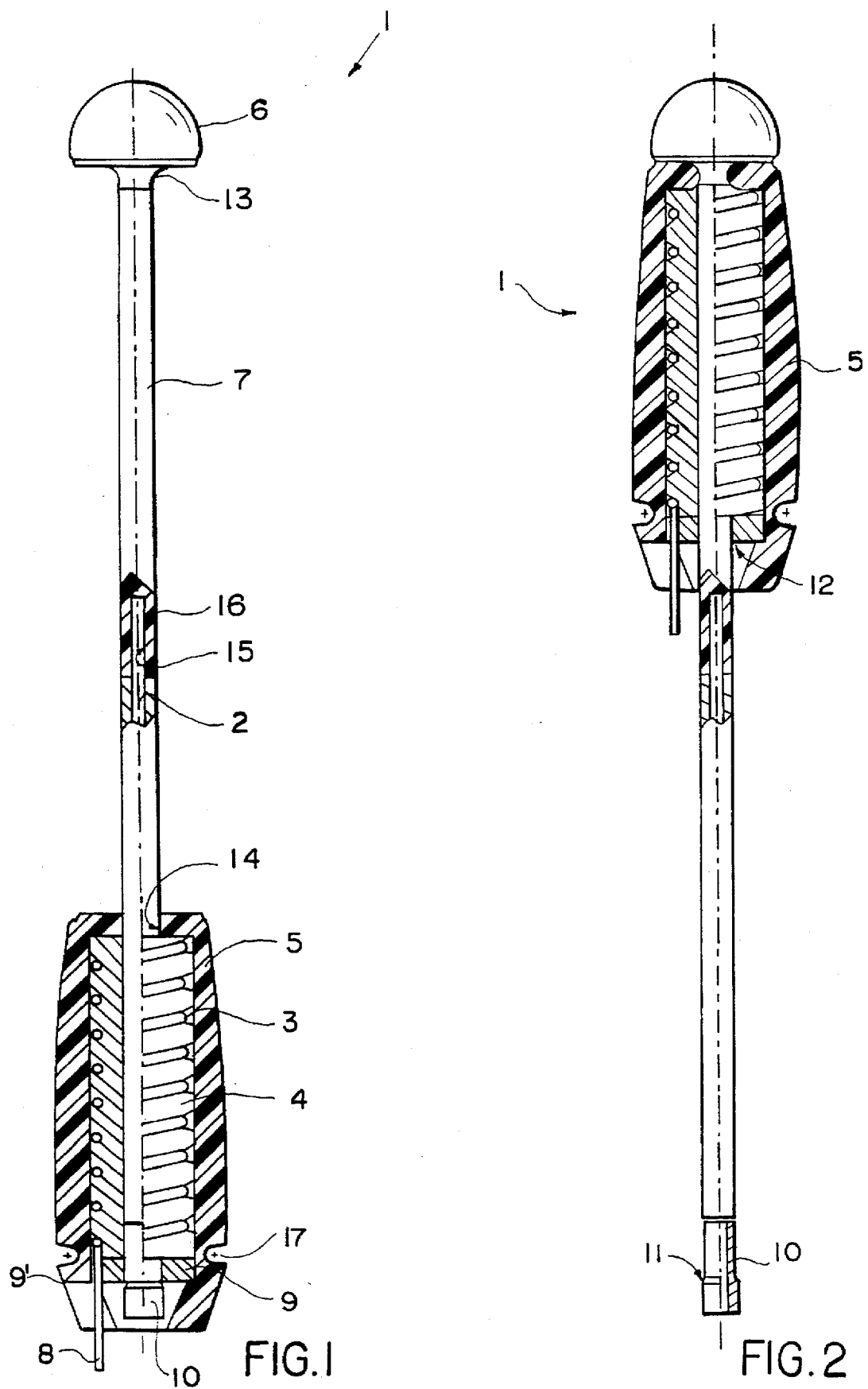
FIG. 1 shows, partly in section, an embodiment of the invention with the first antenna in its extended position.
FIG. 2 shows the device according to FIG. 1 with the first antenna in the retracted position.

The dual antenna device 1 in FIG. 1 comprises a first antenna 2 in its extended position. In the embodiment, the first antenna is comprised of a rod antenna but it may be any other extendable antenna. A second antenna 3 is helically coiled on a support structure 4 and placed inside a casing 5. The first antenna 2 is thus movable inside the second helical antenna 3 between the extended position (FIG. 1) and the retracted position (see FIG. 2). At its upper portion the first antenna is provided with an upper part 7 of insulating material so as to avoid influencing the helical antenna 3 when the first antenna 2 is in the retracted position. At its uppermost end the first antenna 2 is provided with a gripping knob 6.

In its lowermost region the first antenna 2 is provided with a stopper element 10, which constitutes the first holding means. The casing 5 is at its bottom region provided with a seat for an annular magnet 9 which constitutes the second holding means and is placed such that it surrounds the first antenna. The magnet 9 is provided with a radially outwards open slot 9' for a connector wire 8 which is intended for connection between the two antennas and the circuitry of the piece of equipment. The connector wire 8 is placed in such a way within the slot 9' that galvanic contact with the magnet 9 is obtained.

FIG. 2 shows the dual antenna device 1 with the first antenna 2 in the retracted position. In this figure a first abutting surface 11 is shown on a radially extending shoulder on the stopper element. This abutting surface 11 contacts a corresponding second abutting surface 12 in the region of the magnet 9 when in the extended position. In the embodiment shown this second abutting surface is constituted by a collar surface on the magnet itself but it may be constituted for example by the surface of an annular washer, a part of the casing etc. In case of galvanic coupling of the first antenna it is essential that metallic contact is safely obtained between the two abutting surfaces and the contact function may be enhanced by using a washer of a suitable material.

The first antenna is locked in the extended position by means of magnetic attraction between the magnet 9 and the stopper element 10. Preferably the distribution of material in the stopper element 10 and the magnet 9 is such that the magnetic attraction force forces the surfaces 11 and 12 against each other in order to obtain a defined extended position and guarantee the galvanic coupling.

Although the invention has been described in connection with one particular embodiment it is emphasized that the scope of the claims allow also other embodiments.

The coupling between the antenna device according to the described embodiment and the circuitry of the piece of equipment, onto which it is attached, is such that the second, helical antenna is coupled alone (or at least mainly) to said circuitry when the first antenna is in the retracted position, whereas the first and the second antennas are coupled in parallel to said circuitry when the first antenna is in the extended position.

It is possible to use other types of extendable antennas also when not co-operating with or being in the direct neighborhood of a second antenna. The scope of this invention thus includes antenna devices having only an extendable antenna and devices where the extendable antenna is arranged separately with respect to and at a distance from a second antenna. Said second antenna may be a helical antenna, a patch antenna or any other suitable antenna. In cases where the path of the extendable antenna is not surrounded by the casing or the support body for a helical antenna, guide means for guiding the movement of said extendable antenna may be provided on a separate body or casing or may be arranged on or inside the housing of the piece of equipment onto which it is attached.

The arrangement of the first and second holding means may be inverse such that the first holding means contain the magnet whereas the second holding means comprise magnetically attractive material. Also the use of a magnet in both the first and the second holding means is possible.

The magnet may have another form although the annular form is preferred because it allows a slim construction and sufficient intensity of magnetic field. It is thus possible to use a magnet or magnets not surrounding the extendable antenna or separate magnetic elements arranged in a distributed manner around the path of the extendable antenna. Coupling between the magnet and the wire 8 may be achieved in several different ways. According to another solution the magnet is annular but manufactured without the slot 9' and the wire is pressed between the outside of the magnet and the magnet seat of the casing.

Different materials may be used for the elements 9 and 10 but it could be mentioned that neodym-material is preferred in the magnet since the intensity of magnetic field per volume unit using such material allows the use of a small and flat magnet which constitutes less restrictions for the antenna length.

It is also desirable to lock the first antenna in the retracted position, and this may be achieved according to the shown embodiment by means of a groove 13 immediately below the knob 6 co-operating with the inward flange portion 14 at the upper guiding hole of the casing 5. A possible development of the antenna is to arrange a magnetic material inside the upper part 7, which element co-operates with the magnet 9 in the retracted position. Another solution is to have the first holding means co-operating with a separate magnet (or vice versa) inside the casing of a piece of equipment such as a portable telephone.

It could be mentioned that in a preferred method of fixing the upper part 7 onto the rest of the first antenna, the upper part is provided with a hole 15 at its lower end which matches onto an extending free and uncovered portion 16 of the first antenna 2. Appropriate fixing is obtained by gluing, possibly enhanced by providing the portion 16 with engagement protrusions or notches. An embodiment where the knob 6 is placed more closely to the free end of the antenna rod 2 which thus at least partly is positioned inside the helix also in its retracted position (compare with FIG. 2, where the rod is below the helix) is also possible in spite of influences on the function of the helix antenna because of the possibility of having a particularly short rod antenna and/or enhanced rod antenna function.

In order to easily attach the casing and thereby the antenna device to a portable telephone or the like, it is desirable that the casing 5 is resilient and is provided with an annular groove 17 at its lower part in order to allow snap-in fixing in a corresponding hole in the housing of the piece of equipment.

I claim:

1. An antenna device for a piece of equipment for transmitting and/or receiving radio signals, said antenna device comprising a first extendable antenna which is movable between an extended position where the first extendable antenna is coupled to circuitry of the piece of equipment and a retracted position where the first extendable antenna is essentially not coupled to said circuitry, said extendable antenna having a lower portion equipped with first holding means for cooperating with second holding means arranged on a guide means for holding the extendable antenna such that the extendable antenna is releasably locked in the extended position, wherein the extendable antenna is releasably locked by magnetic attraction between the first and second holding means, said first and second holding means comprising mutually magnetically attractive elements.

2. The device according to claim 1, wherein the first and the second holding means comprise abutting surfaces which contact each other in and define said extendable position.

3. The device according to claim 1, wherein said first and second holding means are arranged to couple the extendable antenna galvanically to said circuitry.

4. The device according to claim 1, wherein said first and second holding means are arranged to couple the extendable antenna capacitively to said circuitry.

5. The device according to claim 1, wherein the second holding means comprises a magnet.

6. The device according to claim 5, wherein the second holding means comprises an annular magnet surrounding the extendable antenna.

7. An antenna device for a piece of equipment for transmitting and/or receiving radio signals, said antenna device comprising a first extendable antenna which is movable between an extended position where the first extendable antenna is coupled to the circuitry of the piece of equipment and a retracted position where the first extendable antenna is essentially not coupled to said circuitry, said extendable antenna having a lower portion equipped with first holding means for cooperating with second holding means arranged on a guide means for holding the extendable antenna such that the extendable antenna is releasably locked in the extended position by magnetic attraction between the first and second holding means, said first and second holding means comprising mutually magnetically attractive elements and wherein at least one of the first and the second holding means includes a magnet.

8. The device according to claim 7, including a second antenna, which is constantly coupled to said circuitry.

9. The device according to claim 8, wherein said second antenna is a helical antenna.

10. The device according to claim 9, wherein the helical antenna is arranged so as to surround a movement path of the extendable antenna and wherein said guide means is arranged on or in a casing or a support body for the helical antenna.

11. The device according to claim 8, wherein said second antenna is a patch antenna.

12. A piece of equipment for transmitting and/or receiving radio signals including an antenna device comprising an extendable antenna which is movable between an extended position where the extendable antenna is coupled to the circuitry of the piece of equipment and a retracted position where the extendable antenna is essentially not coupled to said circuitry, said extendable antenna having a lower portion equipped with first holding means for cooperating with second holding means arranged on a guide means for holding the extendable antenna such that the extendable antenna is releasably locked in the extended position by magnetic attraction between the first and second holding means, said first and second holding means comprising mutually magnetically attractive elements and wherein at least one of the first and the second holding means includes a magnet.

13. The piece of equipment according to claim 12, wherein the first and the second holding means comprise abutting surfaces which contact each other in and define said extended position.

14. The piece of equipment according to claim 12, wherein said first and second holding means are arranged to couple the extendable antenna galvanically to said circuitry.

15. The piece of equipment according to claim 12, wherein said first and second holding means are arranged to couple the extendable antenna capacitively to said circuitry.

16. The piece of equipment according to claim 12, including a second antenna, which is constantly coupled to said circuitry.

17. The piece of equipment according to claim 16, wherein said second antenna is a helical antenna.

18. The piece of equipment according to claim 17, wherein the helical antenna is arranged so as to surround a movement path of the extendable antenna and wherein said guide means is arranged on or in a casing or a support body for the helical antenna.

19. The piece of equipment according to claim 15, wherein said second antenna is a patch antenna.

* * * * *